June 12, 1945.  E. C. CLARKE  2,378,188
CHUCK
Filed Dec. 17, 1943
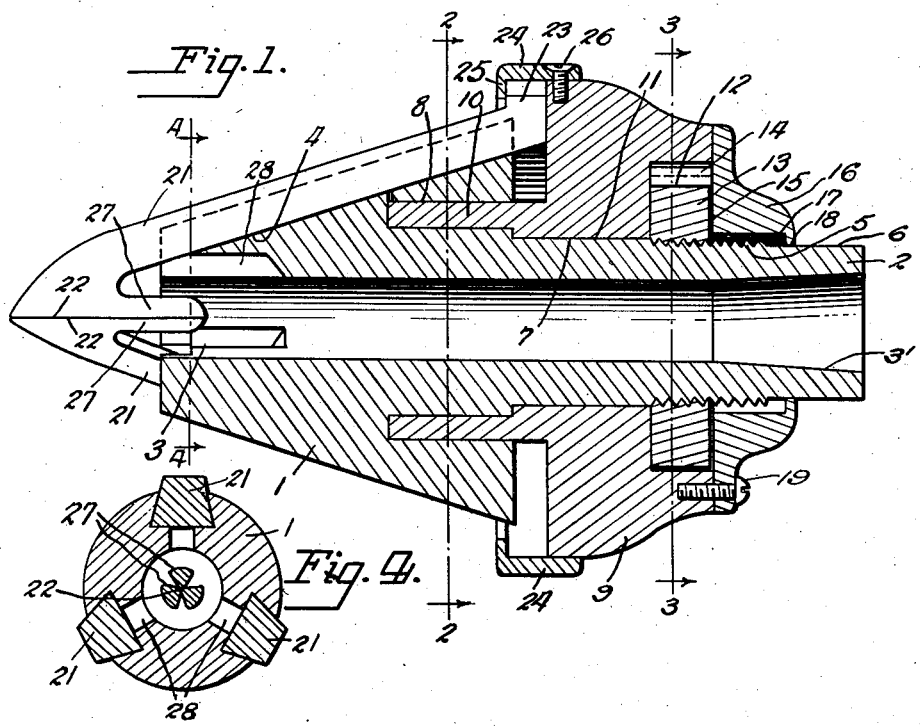
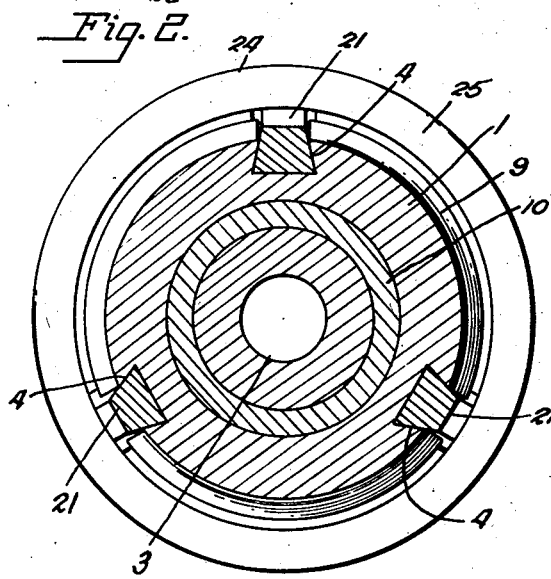
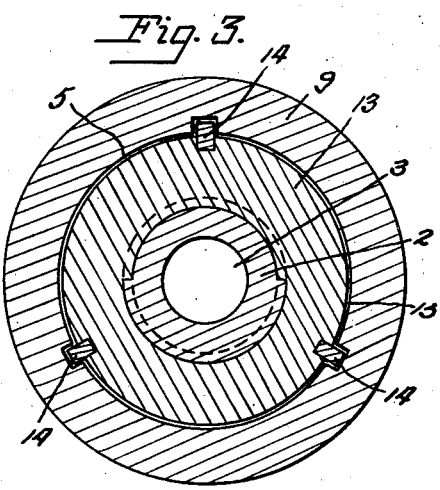
Inventor
E. C. Clarke Patented June 12, 1945

2,378,188

UNITED STATES PATENT OFFICE 2,378,188

CHUCK

Edmund C. Clarke, Jacksonville, Fla.

Application December 17, 1943, Serial No. 514,706

5 Claims. (Cl. 279—65)

This invention relates to chucks, and more particularly to a precision chuck of the type employing a plurality of circumferentially spaced dogs adapted to be advanced and retracted to center and grip the work.

In chucks of this type which have many admirable characteristics, including simplicity of structure and ease of operation, the principal objection is the lack of accuracy in centering the work, with respect to the axis of the chuck, and in some cases to limited control by the gripping jaws to provide proper support for the work to assure accuracy in turning or the like.

The object of the present invention is to provide a chuck of the type indicated, embodying means for providing very great accuracy in the centering of the work and gripping jaws having extended parallel gripping faces adapted to contact and hold the work over a substantial axial length, rather than by the tip or forward edges only.

The invention consists in the novel construction, arrangement and combinations of parts hereinafter more particularly described and claimed.

One sheet of drawing accompanies this specification as part thereof, in which like reference characters indicate like parts throughout.

In the drawing:

Figure 1 is a longitudinal medial cross-section through the improved chuck;

Figure 2 is a transverse cross-section taken on line 2—2 of Figure 1;

Figure 3 is a transverse cross-section taken on line 3—3 of Figure 1;

Figure 4 is a transverse cross-section taken on line 4—4 of Figure 1.

In chucks of the type under consideration, wherein a plurality of circumferentially spaced dog members are adapted to be advanced or retracted to bring their forward ends into gripping relationship with the work, it will be apparent that in order to assure precision in centering it is essential that all the dogs be advanced or retracted equally and simultaneously to assure their contacting the work at equal distances from the axis of the chuck. The usual mode of operating the dogs, with respect to the supporting body of the chuck, is through a nut or other threaded member engaging the dogs either directly or through intermediate parts. In connection with such nuts or other threaded propulsion means, there is present the inherent difficulty of maintaining the nut in true axial alignment with respect to the threaded part with which it cooperates, and by reason of this inherent difficulty and tendency of the nut or other threaded member to cant as it is rotated upon the threaded part, one dog or another is advanced sooner than the others and instead of a uniform advancement of all the dogs it is a staggered motion of the dogs, with resultant inaccuracy in the centering of the work. In accordance with the present invention, it is proposed to interpose between the nut or other threaded propeller member and the dogs an intermediary follower with provision for a sufficient clearance between the surfaces of the nut and the adjacent surfaces of the follower, to permit lost motion in both axial and radial directions, so that in effect the nut bears a floating relationship to the follower and any variation or canting of the nut or threaded member can be taken care of by reason of these clearances, while at the same time provision is made for maintaining the follower in the strictest possible axial alignment with the axis of the chuck body, so that the sliding movement of the follower is always truly axial with respect to the chuck body regardless of any canting of the nut or threaded propelling member.

In the embodiment of the invention herein illustrated, the chuck body is formed with a conical shaped head 1 having a rearwardly directed axial stud 2 and an axial bore 3 extending through both the head and the stud, the stud end of the bore 3 being beveled as at 3' to cooperate with a mandrel as is customary.

On the conical surface of the head 1 are provided a plurality of circumferentially spaced keyways 4 preferably constructed of dovetail cross-section adapted to receive and guide the dogs 21. In connection with the keyways 4, it will be noted that their bottoms are parallel with the conical surface of the head 1, so that the dogs 21 slide at an angle with the axis of the chuck for a purpose hereinafter explained.

The stud 2 is provided with a threaded portion 5 spaced from the rear end by a smooth bearing surface 6 and also spaced from the head 1 by a smooth bearing surface 7, and an annular groove 8 is provided in the head 1 centered on the axis of the head, providing additional interior and exterior bearing faces and in effect constituting an extension of the stud part 2 well within the body of the head 1 so that the bearing surfaces provided by the annular slot 8 and the bearing surfaces 6 and 7 provide supporting bearing faces extending over a major portion of the axial length of the chuck body.

Slidably mounted upon the stud 2 is a follower 9 having on its forward end an annular flange 10 adapted to seat snugly in sliding relationship to the annular groove 8, the follower 9 being further provided with an axial bore providing an interior bearing surface 11 slidable upon the exterior bearing surface 7 of stud 2 and a closure member 16 is adapted to be secured to the rear end of follower 9 as by screws 19, this closure member having an inwardly directed annular flange 18 adapted to closely engage in a sliding relationship upon the outer bearing surface 6 of the stud 2. It will be apparent that the follower 9 is supported at all times against any canting or tilting from true axial alignment with the head and stud 2 by reason of the extended multiple bearing faces extending over a major portion of the length of the head and stud, and this support may be amplified as illustrated by increasing the radius of the annular groove 8 beyond that of the stud 2, so as to further resist any tendency on the part of the follower 9 to cant or adjust itself at any angle other than the true axial alignment of the center of the chuck body.

To propel the follower 9 axially with respect to the head, a nut 13 is threaded upon the threaded portion 5 of stud 2 and seats within an annular recess 15 provided on the rear face of the follower 9, being held in that recess by the closure member 16. The nut 13 is made narrower than the depth of the recess 15 and also of a lesser radius, so that a clearance is provided between the side walls of the nut 13, the base of the annular seat 15, and the inner wall of the closure member 16, as well as between the circumference of the nut 13 and the annular wall of the seat 15, so that the nut 13 is quite free to cant within the seat 15 without affecting in any manner the true alignment of the follower 9. Rotation of the nut 13 by the follower 9 may be secured in any simple manner, either by the shape of the nut or by the use of keys 14 as illustrated, the essential feature being that the nut 13 bears a free floating relationship to the follower 9, permitting the true, uniform, axial movement of follower 9 while at the same time preventing the binding of nut 13 which would occur were it restricted and prevented from canting.

The dogs 21 which slide in the keyways 4 are provided at their forward ends with offset gripping faces 22 parallel with the axis of the chuck, by reason of which offsetting of the gripping faces and the angular seating of the body portions of the dogs it will be apparent that these gripping faces will maintain their parallel axial alignment at all times and will further provide, by reason of their rearward extensions 27, an extended gripping area axially of the device rather than contacting the work through their forward ends only. Notches 28 in the forward end of bore 3 accommodate the extensions 27 of dogs 21 when the latter are in open position. The rear ends of each of the dogs 21 are outturned to provide lugs 23, which lugs are engaged within an annular ring 24 having an inturned annular flange 25, the ring being secured to the follower 9 as by screws 26.

By reason of the structure thus described, it will be apparent that rotation of the follower 9 with respect to the conical-shaped head 1 will turn the floating nut 13 by reason of the key 14 and either retract or advance the dogs 21 uniformly and simultaneously, regardless of the canting of nut 13, by reason of the clearance between all surfaces of the nut and the seat within which it operates, so that the true and accurate axial sliding of the follower 9 will not operate to bind the nut 13, while on the other hand the inevitable canting of nut 13 cannot operate to distort or deflect the follower 9 from its true axial movement with respect to the chuck head 1.

It will be understood, of course, that the bearing faces of the annular groove 8 and the parts 6 and 7 of the stud 2, as well as the complimentary interior bearing faces of follower 9 and flange 18, will be carefully machined and ground with the maximum precision and preferably a small air vent 27 will communicate the annular flange 8 with the exterior of head 1 so as to prevent the entrapment of air within the annular groove 8 upon the advancement of the flange 10 therein.

Various modifications will readily suggest themselves to those skilled in the art, but all within the scope of the present invention as claimed.

I claim:

1. Precision chuck comprising a head having an axially extending projection provided with a plurality of exterior bearing faces, dogs slidable axially of the head, a follower provided with a bore having a plurality of interior bearing faces adapted to contact the exterior bearing faces of the head projection to hold the follower in true axial alignment, means on the follower for operatively engaging the dogs and means for sliding the follower axially of the projection part.

2. Precision chuck comprising a head having an axially extending stud formed with a plurality of bearing faces and a threaded portion dogs slidable axially on the head, a follower provided with a plurality of complementary bearing faces, means on the follower for operatively engaging the dogs, a nut engaging the threaded portion of the stud and adapted to engage the follower, said nut floating with respect to the follower, except in axial lines of contact for sliding the follower axially of the head.

3. Precision chuck comprising a conical shaped head provided with circumferentially spaced keyways and a rearwardly extending axial stud, dogs slidable in the keyways, a follower slidably mounted on the stud and engaging the dogs, the follower and stud having a plurality of axially spaced complementary bearing faces extending over a major portion of the axial length of the chuck, a nut threaded on the stud intermediate two pairs of the said complementary bearing faces, said nut seated in a recess in the follower dimensioned to provide lost motion between the nut and follower both radially and axially.

4. Precision chuck comprising a conical shaped head, with a plurality of circumferentially spaced keyways opening on the conical face and conforming with it in angularity, dogs slidable in the keyways having their forward ends formed as gripping faces parallel with the axis of the head and their rear ends formed with outwardly directed lugs, the large end of the conical shaped head formed with an inwardly directed annular groove centered on the axis of the head and having a rearwardly extending axial stud, said stud formed with spaced bearing surfaces and an intermediate threaded part, the head and stud formed with an axial bore, a follower having a forwardly directed annular flange adapted to seat slidably in the groove of the head, said follower having a bore slidably seated on a bearing surface of the stud, an annular flange engaging the lugs of the dogs and a rearwardly opening annular seat, a closure for said seat formed with a bearing surface to engage the stud, a nut on the threaded part of the stud within the annular seat of the follower and proportioned to provide a clearance with respect to all surfaces of the seat, said nut keyed to the follower to be rotated thereby.

5. Precision chuck comprising a conical shaped head provided with circumferentially spaced dovetail ways and a rearwardly extending axial stud, dogs slidable in the dovetail ways, a follower slidably mounted on the stud and engaging the dogs, the follower and stud having a plurality of axially spaced complementary bearing faces extending over a major portion of the axial length of the chuck, a nut threaded on the stud intermediate two pairs of the said complementary bearing faces, said nut seated in a recess in the follower dimensioned to provide lost motion between the nut and follower both radially and axially.

EDMUND C. CLARKE.